No. 848,022. PATENTED MAR. 26, 1907.
L. A. FRAYER & W. J. MILLER.
FENDER FOR VEHICLES.
APPLICATION FILED MAY 7, 1906.

2 SHEETS—SHEET 1.

WITNESSES:
Th. E. French
R. Rogers.

INVENTORS
Lee A. Frayer
William J. Miller
BY
Geo. W. Rightmire
ATTORNEY.

No. 848,022. PATENTED MAR. 26, 1907.
L. A. FRAYER & W. J. MILLER.
FENDER FOR VEHICLES.
APPLICATION FILED MAY 7, 1906.

2 SHEETS—SHEET 2.

UNITED STATES PATENT OFFICE.

LEE A. FRAYER AND WILLIAM J. MILLER, OF COLUMBUS, OHIO, ASSIGNORS TO THE OSCAR LEAR AUTOMOBILE COMPANY, OF COLUMBUS, OHIO, A CORPORATION OF OHIO.

FENDER FOR VEHICLES.

No. 848,022.      Specification of Letters Patent.      Patented March 26, 1907.

Application filed May 7, 1906. Serial No. 315,527.

*To all whom it may concern:*

Be it known that we, LEE A. FRAYER and WILLIAM J. MILLER, citizens of the United States, residing at Columbus, in the county of Franklin and State of Ohio, have invented certain new and useful Improvements in Fenders for Vehicles, of which the following is a specification.

Our invention relates to improvements in fenders for vehicles to prevent the mud and dust thrown by wheels in motion from coming in contact with the body of the vehicle, and relates especially to fenders used for automobiles.

The fenders in use are placed above and partially in front of the rear wheel and above and partially in the rear of the front wheel, but are not so constructed as to close up completely the space between the wheel and the body of the vehicle.

Further, the fenders in use are secured upon hangers or laterally-extending rods and by long and severe usage are loosened, and consequently rattle in a disagreeable manner, detracting greatly from the value and use of the vehicle.

Further, the fenders in use are not connected with the step or steps at the side of the vehicle, and in consequence the steps are spattered with mud and covered with loose dirt or dust, caused to collect by the action of the wheels in motion.

Further, the fenders in use not only have the disadvantages mentioned, but are not attractive in appearance.

The disadvantages arising from the use of present fenders, which consist especially in the failure to guard the vehicle-body and the steps from mud and dirt, and in the use of several parts secured together which loosen in use, and unsightliness in a greater or less degree, are obviated by the improved fenders, which will now be described.

Figure 1:
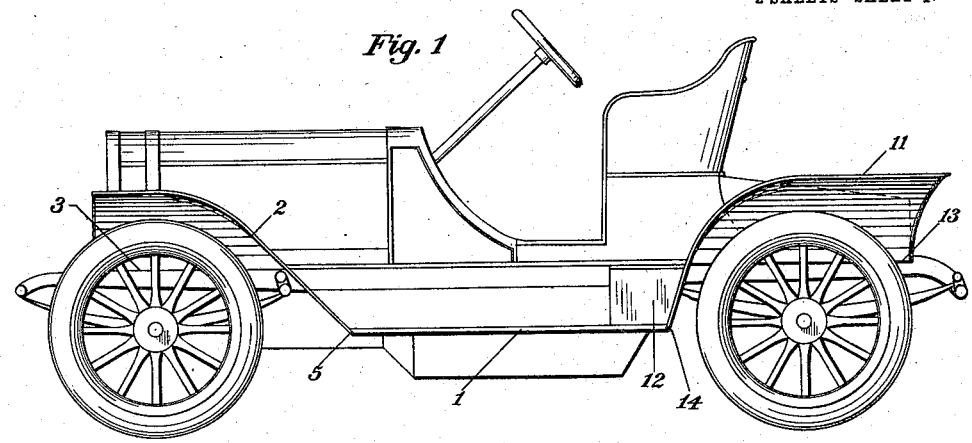
Figure 2:
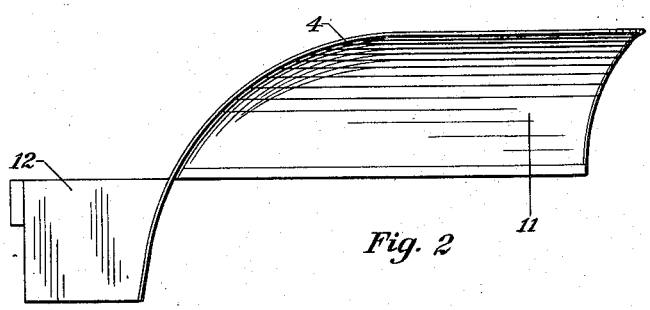
Figure 4:
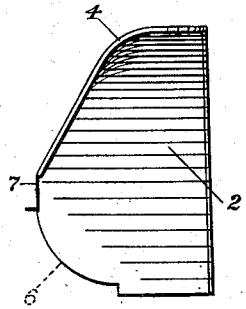
Figure 3:
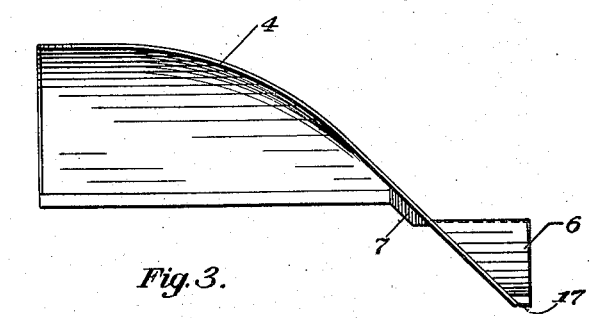
Figure 5:
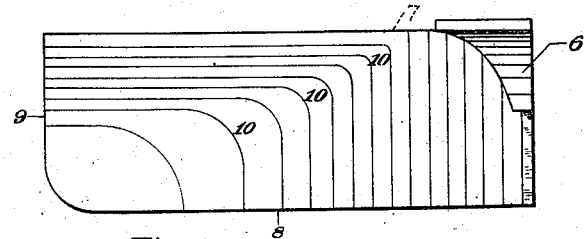
Figure 6:
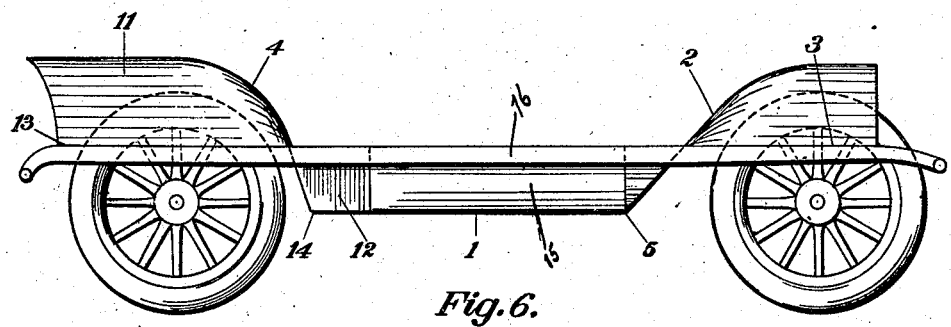

In the accompanying drawings, Figure 1 is a side view of an automobile with our improved fenders in place. Fig. 2 is a side view of the rear fender. Fig. 3 is a side view of the front fender. Fig. 4 is a front view of the same. Fig. 5 is a top view of the same, showing the contour lines. Fig. 6 is a side view of the vehicle looking outwardly, showing the fenders in place, illustrating the connection of the fenders with the side rail.

Referring to the drawings, in which the same reference-numerals indicate like parts throughout, 1 is the step, extending along the side of the vehicle. The step is joined along its rear side to a piece 15, which is secured along its upper side to the side rail 16. This construction completely protects the step from dust and dirt which might be thrown up from the inner side of the vehicle by the action of the wheels.

2 is the front fender, which is attached to the body of the vehicle, as appears at 3, so as to leave no space between, whereby the radiator and the vehicle-body are completely protected from the dust and dirt thrown by the front wheel. The fender curves upwardly and outwardly from the vehicle-body and extends above and outside of the wheel. At a point practically above the hub of the wheel the fender begins to curve downwardly, as shown at 4, and curves away uniformly to the step described above, and it is secured at its rear end 5 by means of the extension 6 and the flange 17 to the step and the depending piece 15. A downward extension 7 is provided to secure a close fit of the fender against the vehicle-body where the fender engages the side rail of the frame. This fender is made, preferably, of one large sheet of metal, curved in three directions, as appears in Fig. 5, one curve being shown along the side, (indicated at 8,) a second along the end, (indicated at 9,) and a third compound curve, (indicated by the change of direction in the contour lines at 10.) The metal bent in this manner forms a fender which is adapted to be secured tightly against the side of the vehicle-body and against the side step thereof shown at 1, and along the whole inner edge, where the fender is secured to the vehicle-body, the contact is so close that dust and mud thrown by the front wheel under any conditions of usage will be received upon the under surface of the fender and step, and the radiator and whole front end of the vehicle will be protected. Likewise the step is protected, inasmuch as the rearwardly-curved under surface of the fender will receive the dust and mud thrown by the wheel. In this way also the side of the vehicle between the wheels is protected equally with the front end thereof.

The extension indicated at 6 is preferably made from a second metal strip and firmly secured to the above-described sheet by means of rivets. It is found that a small strip can be more easily bent into the desired shape to extend from the side rail of the frame to the step and then secured to the large sheet than it is to bend the large sheet into the necessary form, and at the same time no weakening of the structure results from forming it of the two pieces, as described.

The fender is strengthened by being grooved along the free sides thereof near the outer edge, and the edge is turned to form a sheath for a rod, which lies along the whole outer edge, thereby still further strengthening and stiffening the free sides of the fender. The inner side is appropriately shaped, so that it may be securely riveted or bolted upon the frame of the vehicle, and the same means is provided for securing the fender at its end to the step.

The great advantages of our fender consist in its being made essentially of one sheet of metal bent gracefully to form the inwardly and rearwardly extending curves and the compound curve between, so that it may extend above and beyond the wheel, also to the rear of the front wheel, and is secured directly to the vehicle-body in such manner that it effectually prevents dust and dirt from being thrown against the body. At its rear end the front fender is secured to the step in such manner that the step is protected from dust and dirt and the side of the vehicle between the wheels is likewise protected by the rearward curve of the fender in connection with the step extending along the side of the vehicle. This construction provides a fender which is strong and graceful and one which is not easily shaken from position by use and which has no plurality of parts which by usage would be loosened and become objectionable on account of the consequent rattling when the vehicle is in motion.

The rear fender 11 is constructed, essentially, like the front one, except, of course, that the connection with the step is on the front side of the rear wheel, on which side the fender curves downwardly rather abruptly and has attached thereto the extension shown at 12, which incloses some of the operating mechanism and protects it, and affords an additional step up to the rear seats of the vehicle. At the rear side the fender is open and extends beyond the rear wheel. The rear fender is securely attached to the vehicle-body at its inner side 13 and to the step and frame at its front side 14 and completely protects the vehicle-body from the dust and dirt thrown by the rear wheel when in motion.

The step 1 in our construction is rather wide and extends along the side of the vehicle-body between the front and rear wheels, as clearly shown in Fig. 6. It is connected with the front and rear fenders, as shown at 5 and 14, and is closely joined at the back side thereof to the piece 15, depending from the side rail 16, in such manner that a continuous fender along the whole side of the vehicle is formed.

It is apparent that with the construction shown the vehicle is completely protected from the dust and mud thrown by the wheels when in motion. Further, the construction has only a few parts, which are firmly secured together and to the vehicle-body, and therefore there is little likelihood of their becoming loose and getting out of repair on account of usage. This arrangement also enables this necessary feature of an automobile or other vehicle to be provided at less expense than heretofore, and we therefore attain a much-desired result in providing a fender construction which is not only cheaper and more durable, but also completely protects the vehicle along its whole side from the dust and dirt due to travel.

What we claim as new, and desire to secure by Letters Patent, is—

1. In a vehicle, a fender construction secured continuously along one of its edges to one side of said vehicle, and constructed to protect the step and the entire side of the vehicle both adjacent the wheels and between the wheels from all dust and mud set in motion by the movement of the wheels.

2. In a vehicle, a member secured continuously along one of its edges to one side of said vehicle between the wheels, a plurality of integral fenders each secured continuously along one of its edges to the side of said vehicle and arranged thereon to be opposite a wheel and curved upwardly and outwardly to extend at the side of, above, and beyond said wheel, and curved downwardly at one end and adapted to be secured at said end to said member, whereby there is formed a complete protection for said vehicle from the dust and mud cast by the wheels when in motion.

3. A fender for vehicles composed of a metallic sheet formed to present a cover for a wheel, a side guard therefor, and an end guard therefor, said fender being secured to the body of the vehicle and engaging continuously therewith along one of the sides of said fender.

4. A fender for wheeled vehicles, composed of a metallic sheet having one of its edges secured to the body of the vehicle and engaging therewith continuously along said edge, and constructed to extend upwardly and outwardly from said edge at the side of and above the wheel, and to extend downwardly at one end thereof, a member secured continuously along one of its edges to the body of said vehicle and engaging continuously therewith, said fender being united at its downwardly-extending end to said member, whereby a continuous protection is afforded to said vehicle-body both at the sides of the wheels and above them, and between the wheels.

5. A rigid fender structure for vehicles formed to present a cover for a wheel, a side guard therefor, and an end guard therefor, said fender being secured along one of its edges to the body of the vehicle, and continuously engaging therewith.

In testimony whereof we affix our signatures in the presence of two witnesses.

LEE A. FRAYER.
WILLIAM J. MILLER.

Witnesses:
ROBERT L. ATKINSON,
GEO. W. RIGHTMIRE.